(12) United States Patent
Nagao (10) Patent No.: US 7,760,933 B2
(45) Date of Patent: Jul. 20, 2010

(54) PARAMETER ESTIMATION METHOD, PARAMETER ESTIMATION DEVICE AND COLLATION METHOD

(75) Inventor: Kenji Nagao, Kanagawa (JP); Etsuko Nagao, legal representative, Kanagawa (JP)

(73) Assignee: Panasonic Corporation, Osaka (JP)

( * ) Notice: Subject to any disclaimer, the term of this patent is extended or adjusted under 35 U.S.C. 154(b) by 918 days.

(21) Appl. No.: 11/596,431

(22) PCT Filed: Apr. 27, 2005

(86) PCT No.: PCT/JP2005/008006

§ 371 (c)(1),
(2), (4) Date: Nov. 14, 2006

(87) PCT Pub. No.: WO2005/111936

PCT Pub. Date: Nov. 24, 2005

(65) Prior Publication Data

US 2007/0230773 A1  Oct. 4, 2007

(30) Foreign Application Priority Data

May 14, 2004 (JP) ............................. 2004-144504

(51) Int. Cl.
*G06K 9/62* (2006.01)
(52) U.S. Cl. .................. 382/159; 382/118; 382/181
(58) Field of Classification Search .................. 382/118, 382/115, 181
See application file for complete search history.

(56) References Cited

FOREIGN PATENT DOCUMENTS

| JP | 2000-90274 | 3/2000 |
| JP | 2001-266145 | 9/2001 |
| JP | 2003-173444 | 6/2003 |
| JP | 2004-30552 | 1/2004 |

OTHER PUBLICATIONS

Li et al: "Kernel machine based learning for multi-view face detection and pose estimation", Proc. Computer vision, ICCV 2001, IEEE International Conference, pp. 674-679.*
Shintaro Izoe et al., "Fractal-based Image Disocclusion using Kernel Principal Components Analysis", The Institute of Electronics, Information and Communcation Engineers Gijutsu Kenkyu Hokoku, vol. 101, No. 362, Oct. 11, 2001, pp. 55 to 62.

(Continued)

*Primary Examiner*—Samir A. Ahmed
*Assistant Examiner*—Ruiping Li
(74) *Attorney, Agent, or Firm*—RatnerPrestia (57) ABSTRACT

A parameter estimation method for estimating a parameter by estimating maximum a posteriori probability for input data. Operation for the input data is expressed by an inner product for the input data and the inner product is replaced by a Kernel function. By using the calculation result of the kernel function, a parameter is estimated. The method includes a step (offline operation) for learning a correlation between a plurality of learning input data in which a parameter to be estimated is known and the parameter corresponding to each of the learning input data; and a step (online operation) for estimating the parameter for the estimating input data in which a parameter to be estimated is unknown, by using the learned correlation.

4 Claims, 9 Drawing Sheets

OTHER PUBLICATIONS

Eisaku Maeda, "Tsukai! Support Vector Machine", Joho Shori, vol. 42, No. 7, IPSJ Magazine, Jul. 15, 2001, pp. 676 to 683.
Hiroharu Tsuda, "Support Vector Machine towa Nanika", The Journal of the Institute of Electronics, Information and Communication Engineers, vol. 83, No. 6, Jun. 25, 2000, pp. 460 to 466.
Roberto Brunelli et al., "Face Recognition: Features versus Templates", IEEE Transactions on Pattern Analysis and Machine Intelligence, vol. 15, No. 10, pp. 1042 to 1052, Oct. 1993.
Zhang Yankun, et al., "Face Recognition Using Kernel Principal Component Analysis and Genetic Algorithms", IEEE, Dec. 31, 2002.

* cited by examiner

PARAMETER ESTIMATION METHOD, PARAMETER ESTIMATION DEVICE AND COLLATION METHOD

TECHNICAL FIELD

The present invention relates to a parameter estimation method for estimating a specific parameter from input data, a parameter estimation device, and a collation method using the same.

BACKGROUND ART

Processing for estimating a specific parameter from an input image is general processing in pattern information processing. An example of such processing includes processing of extracting positions of the eyes and nose from an image of a person's face and processing of extracting a position of a number plate from an image of a car.

Conventionally, the most popular method for such processing is a so called matched filter method of carrying out comparison and collation by the use of a template, and many examples of using this method have been proposed. An example of a method of extracting features of a face based on such a method is described in detail in R. Brunelli, T. Poggio, "Face Recognition: Features versus Template", IEEE Trans. Patt. Anal. Machine Intell., vol. PAMI-8, pp. 34-43, 1993.

Such a conventional method has a problem that processing time is long, or processing cost is accordingly increased. In the case where a normalized correlation is employed as a similarity standard, when the number of pixels of an input image is denoted by S, that of a template is denoted by T and multiplication is employed as a unit operation, 2×T×S times operations are needed. When this is applied to extraction of features of a face image, when S is 150×150=22500 (pel) and T is 50×20=1000 (pel), 2×1000×22500=45 million times of multiplications are needed. Although an operating speed of a computer has been certainly improved, an enormous operating cost is needed.

In many cases, as a template used for collation, data such as an average of all learning data are used. Therefore, collation cannot be carried out successfully depending upon the environment. Consequently, there is a technique for preparing a plurality of templates corresponding to input images and calculating the similarity. However, since the processing amount is increased in accordance with the increase of the number of templates, the processing time of a computer is further increased.

SUMMARY OF THE INVENTION

In view of the foregoing problem, a parameter estimation method, a parameter estimation device, and a collation method of the present invention were made. The object of the present invention is to estimate a parameter with respect to input data precisely with a short processing time or at a low processing cost.

In order to solve the foregoing problem, a parameter estimation method of the present invention includes expressing an operating method for estimating maximum a posteriori probability with respect to input data by an inner product for the input data; replacing the inner product by a kernel function; and estimating a parameter by using a calculation result of the kernel function.

REFERENCE MARKS IN THE DRAWINGS 10 data input section
20 CPU
22 learning kernel matrix calculation means
23 eigenvalue calculation means
26 estimation kernel calculation means
27 parameter calculation means
30 memory
40 secondary storage device
50 display
60 mouse
90 system bus
100 parameter estimation device
110, 115 (video) camera 140 face image database
200, 300 face image collation device

DETAILED DESCRIPTION OF THE PREFERRED EMBODIMENTS

A parameter estimation method of the present invention includes expressing an operating method for estimating maximum a posteriori probability with respect to input data by an inner product for the input data; replacing the inner product by a kernel function; and estimating a parameter by using a calculation result of the kernel function. This method enables precise estimation of a parameter with respect to input data with a short processing time or at a low processing cost.

Furthermore, the parameter estimation method of the present invention includes learning a correlation between a plurality of learning input data in which a parameter to be estimated is known and a parameter corresponding to each of the learning input data, and estimating a parameter with respect to estimating input data in which a parameter to be estimated is unknown by using the learned correlation. The learning includes calculating a learning kernel matrix by using the plurality of learning input data in which a parameter to be estimated is known, and obtaining an eigenvalue and an eigenvector of an inverse matrix of the learning kernel matrix. The estimating includes calculating an estimation kernel by using the estimating input data in which a parameter to be estimated is unknown and the learning input data, and estimating a parameter of the estimating input data by using the learning kernel matrix, and the eigenvalue and the eigenvector of the inverse matrix of the learning kernel matrix. This method enables precise estimation of a parameter with respect to input data by using a computer system with a short processing time or at a low processing cost.

Furthermore, a parameter estimation method of the present invention includes a learning means for learning a correlation between a plurality of learning input data in which a parameter to be estimated is known and a parameter corresponding to each of the learning input data, and an estimation means for estimating a parameter with respect to estimating input data in which a parameter to be estimated is unknown by using the learned correlation. The learning means includes a learning kernel matrix calculation means for calculating a learning kernel matrix by using the plurality of learning input data in which a parameter to be estimated is known, and an eigenvalue calculation means for obtaining an eigenvalue and an eigenvector of an inverse matrix of the learning kernel matrix. The estimation means including an estimation kernel calculation means for calculating an estimation kernel by using the estimating input data in which a parameter to be estimated is unknown and the learning input data, and a parameter calculation means for calculating a parameter with respect to the estimating input data by using the learning kernel matrix, and the eigenvalue and the eigenvector of the inverse matrix of the learning kernel matrix. With this configuration, it is possible to realize a parameter estimation device capable of estimating a parameter with respect to input data precisely with a short processing time or at a low processing cost.

Furthermore, in the parameter estimation device of the present invention, the estimating input data and the learning input data may be an image including a face, and the parameter to be estimated may be a coordinate of a feature of the face. With this configuration, it is possible to provide a parameter estimation device suitable for a face collation device.

Furthermore, the collation method of the present invention uses the parameter estimation device of the present invention and a face image database. The method includes: estimating a coordinate of a feature of a face with respect to a face image to be collated by using the parameter estimation device; then cutting out a face region based on the coordinate of the feature of the face; and collating a face image registered in the face image database with the cut-out face region. According to this method, it is possible to cut out a face region used for face collation from the face images with a short processing time or at a low processing cost.

Furthermore, the collation method of the present invention uses the parameter estimation device of the present invention and a face image database. The method includes repeating a face image normalization operation plural times, the operation including estimating a coordinate of a feature of a face by using the parameter estimation device and normalizing an image region based on the coordinate of the feature of the face; then cutting out a face region based on the coordinate of the feature of the face; and collating a face image registered in the face image database with the cut-out face region. This method enables estimation of a coordinate of the feature with high precision with respect a face image even when a face position moves largely in a screen.

Furthermore, in the parameter estimation device of the present invention, the estimating input data and the learning input data may be an image including a face, and the parameter to be estimated may be height information of the face image. With this configuration, it is possible to estimate three-dimensional face information from a two-dimensional face image.

Furthermore, the collation method of the present invention uses the parameter estimation device of the present invention and a face image database. The method includes estimating height information with respect to a face image to be collated by using the parameter estimation device; and then synthesizing a two-dimensional image seen from a same angle as an angle of a face image registered in the face image database based on the height information of the face image and carrying out a collation. According to this method, even if a face image faces in any directions, it can be collated with face images facing the front or facing the side registered in the face image database.

Furthermore, the collation method of the present invention uses the parameter estimation device of claim 7 and a face image database. The method includes estimating height information with respect to a face image registered in the face image database by using the parameter estimation device; then synthesizing a two-dimensional image seen from an angle that is different from an angle of the registered face image; and additionally registering the synthesized two-dimensional image in the face image database. According to this method, it is possible to collate the input face image with the face images registered in the face image database directly. Therefore, high speed collation can be carried out.

First Exemplary Embodiment

Figure 1:
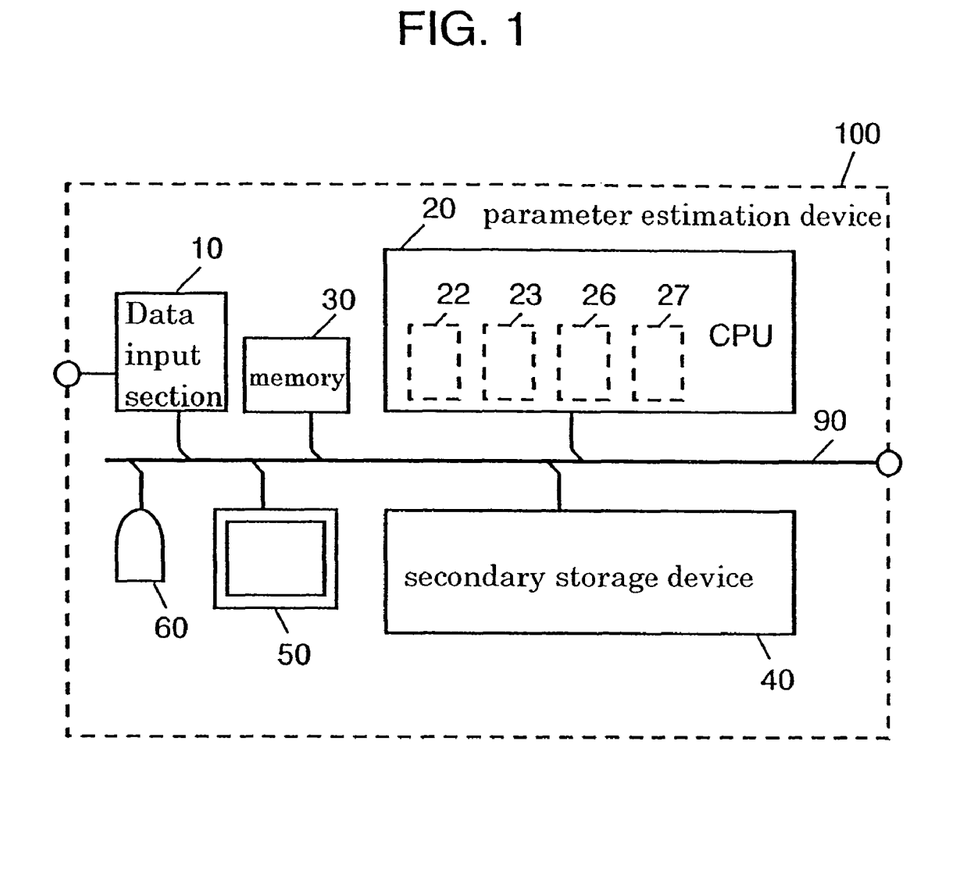
FIG. 1 is a block diagram showing a parameter estimation device in accordance with a first exemplary embodiment of the present invention.

FIG. 1 is a block diagram showing a parameter estimation device in accordance with a first exemplary embodiment of the present invention, which is realized by a computer system. Parameter estimation device 100 includes data input section 10 for exchanging data with external equipment, CPU 20 for carrying out data processing, memory 30 for program storage and program work, secondary storage device (hard disk, magneto-optical disk, and the like) 40 for storing large data such as input data for estimating a parameter, correlation data, or the like, display 50 as a system console, and mouse 60 as a man-machine interface. Each of the above-mentioned blocks is connected to system bus 90.

By executing a corresponding program, CPU 20 works as learning kernel matrix calculation means 22 and eigenvalue calculation means 23, which are learning means, and also works as estimation kernel calculation means 26 and parameter calculation means 27, which are estimation means. Secondary storage device 40 secures a region for storing various kinds of data mentioned below.

Parameter estimation device 100 is based on the fact that there is a correlation between input data for estimation and a parameter to be estimated. That is to say, as to many learning input data in which a parameter to be estimated is known, a correlation between input data and a parameter is learned in advance. Then, by using this correlation, a parameter for arbitrary input data is estimated.

Firstly, an operation of learning the correlation between the input data and the parameter by using the learning samples (hereinafter, referred to as "offline processing") is described. The input data in which a parameter to be estimated is known in advance is represented by n-dimensional input vector I and a parameter with respect to input vector I is represented by m-dimensional parameter vector Q. The total number of the learning samples is denoted by N.

Figure 2:
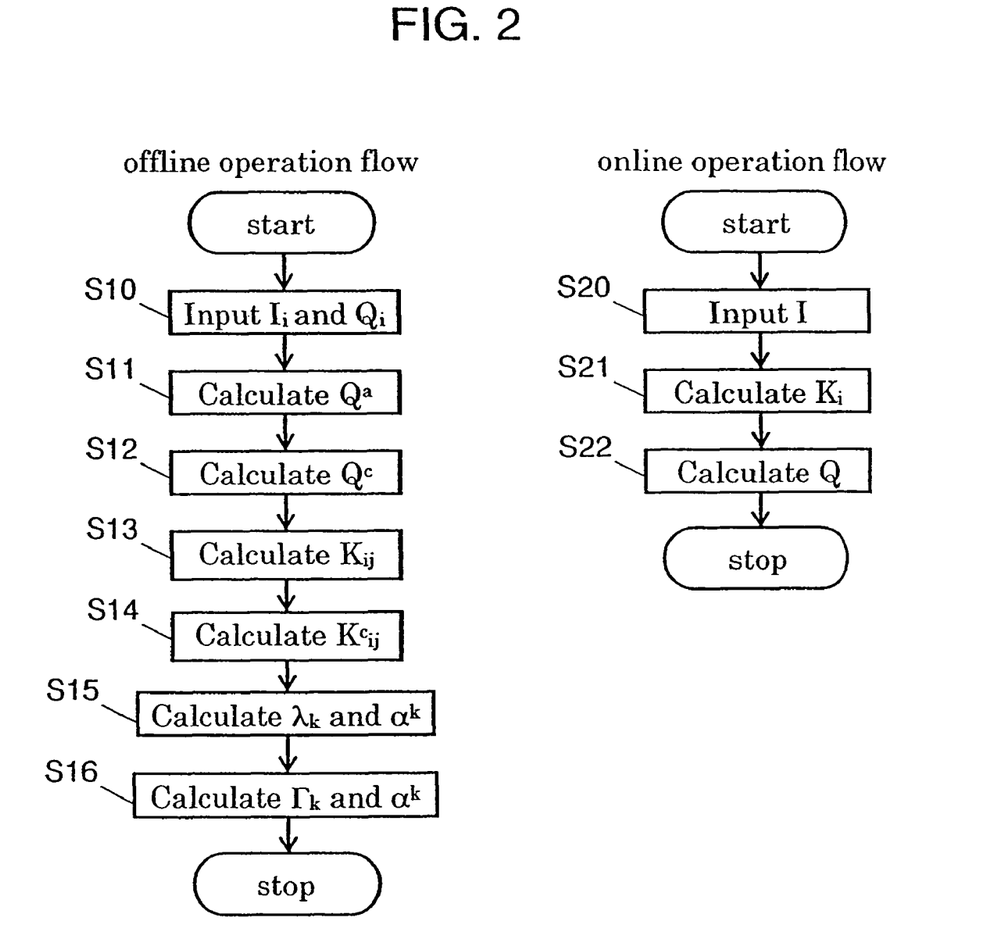
FIG. 2 is a flowchart of the parameter estimation device in accordance with the first exemplary embodiment of the present invention.

FIG. 2 is a flowchart of parameter estimation device 100 in accordance with the first exemplary embodiment of the present invention. CPU 20 executes the following flow by executing a program stored in memory 30.

Firstly, N pieces of input vectors $I_i$ (i=1 to N) and parameter vectors $Q_i$ are input into data input section 10 and stored in secondary storage device 40 (S10).

Next, CPU 20 calculates average parameter vector $Q^a$ from N pieces of parameter vectors $Q_i$ in accordance with Equation 1 and transfers the calculated parameter vectors $Q^a$ to secondary storage device 40 so as to be stored therein (S11).

$$Q^a = \frac{1}{N} \sum_{i=1}^{N} Q_i \quad \text{[Equation 1]}$$

Then, CPU 20 calculates deviation parameter vector $Q^c_i$ from average parameter vector $Q^a$ with respect to each of N pieces of parameter vectors $Q_i$ based on Equation 2, and transfers the calculated vector $Q^c_i$ to secondary storage device 40 so as to be stored therein (S12).

$$Q^c_i = Q_i - Q^a \quad \text{[Equation 2]}$$

Next, CPU 20, as learning kernel matrix calculation means 22, calculates learning kernel matrix $K_{ij}$ (i and j=1 to N) from input vectors $I_i$ and $I_j$. As the kernel, a polynomial kernel, a sigmoid kernel, and the like, can be employed. In this exemplary embodiment, a Gaussian kernel shown in Equation 3 is used. The calculated learning kernel matrix $K_{ij}$ is transferred to and stored in secondary storage device 40 (S13).

$$K(I_i, I_j) = K_{ij} = \exp\left(-\frac{\|I_i - I_j\|^2}{2\sigma^2}\right) \quad \text{[Equation 3]}$$

Then, deviation learning kernel matrix $K^c_{ij}$ around the average value is calculated based on Equation 4. The calculated matrix $K^c_{ij}$ is transferred to and stored in secondary storage device 40 (S14).

$$K^c_{ij} = K_{ij} - \frac{1}{N}\sum_{k=1}^{N}\{K_{i_k} + K_{j_k}\} + \frac{1}{N^2}\sum_{k,l=1}^{N} K_{kl} \quad \text{[Equation 4]}$$

Next, CPU 20, as eigenvalue calculation means 23, solves the eigenequation (Equation 5) of deviation learning kernel matrix $K^c$ so as to obtain eigenvalue $\lambda_k$ (k=1 to M) and eigenvector $\alpha^k$. The obtained eigenvalue $\lambda_k$ and eigenvector $\alpha^k$ are transferred to and stored in secondary storage device 40 (S15). Herein, M represents an independent number of the eigenvector, and the maximum M is equal to the number N of the learning samples.

$$K^c \alpha^k = \lambda_k \alpha^k \quad \text{[Equation 5]}$$

Herein, $K^c$ denotes a deviation learning kernel matrix. What has been mentioned is data necessary to express the correlation between input vector $I_i$ and parameter vector $Q_i$. However, in order to simplify the calculation in the following estimation step, the next calculation is further carried out. By using deviation parameter vector $Q^c_i$, deviation learning kernel matrix $K^c_{ij}$, eigenvalue $\lambda_k$ and eigenvector $\alpha^k$ obtained above, M pieces of m-dimensional constant vectors $\Gamma_k$ are calculated based on Equation 6. Furthermore, by using constant vector $\Gamma_k$, learning kernel matrix $K_{ij}$ and eigenvector $\alpha^k$, m-dimensional constant vector $\Omega$ is calculated based on Equation 7. Constant vector $\Gamma_k$ and constant vector $\Omega$ are stored in secondary storage device 40 (S16).

$$\Gamma_k = \frac{1}{N}\lambda_k^{-1}\sum_{i=1}^{N}\sum_{j=1}^{N} Q^c_i \alpha^k_j K^c_{ij} \quad \text{[Equation 6]}$$

$$\Omega = \sum_{i=1}^{M}\Gamma_i \sum_{j=1}^{N} \alpha^i_j \left(-\frac{1}{N}\sum_{k=1}^{N} K_{jk} + \frac{1}{N^2}\sum_{l,m}^{N} K_{lm}\right) \quad \text{[Equation 7]}$$

The processing mentioned above is processing executed offline in parameter estimation device 100. In secondary storage device 40, average parameter vector $Q^a$, constant vector $\Omega$, constant vector $\Gamma_k$ and eigenvector $\alpha^k$, which have been obtained in the above-mentioned processing, are stored. Thus, in the offline processing, CPU 20 works as a learning means.

Next, a step of actually estimating a parameter with respect to the input data having a parameter to be estimated (hereinafter, referred to as "online processing") is described. Also in the online processing, CPU 20 executes the following flow by executing a program stored in memory 30.

Firstly, input data having a parameter to be estimated are input as input vector I into data input section 10 and stored in secondary storage device 40 (S20).

Next, CPU 20, as estimation kernel calculation means 26, calculates estimation kernel $K_i$ (±1 to N) based on Equation 8. The calculated estimation kernel $K_i$ is transferred to and stored in secondary storage device 40 (S21).

$$K_i = \exp\left(-\frac{\|I - I_i\|^2}{2\sigma^2}\right) \quad \text{[Equation 8]}$$

Then, CPU 20, as parameter calculation means 27, reads out average parameter vector $Q^a$, constant vector $\Omega$, constant vector $\Gamma_k$ and eigenvector $\alpha^k$, which have been obtained in the offline processing, and estimation kernel $K_j$, which has been obtained in step S21, from secondary storage device 40; calculates parameter vector Q showing a parameter to be estimated, by using Equation 9; and stores the estimated parameter vector Q in secondary storage device 40 (S22).

$$Q = Q^a + \Omega + \sum_{i=1}^{M} \Gamma_i \left\{ \sum_{j=1}^{N} \alpha_j^i \left( K_j - \frac{1}{N} \sum_{j=1}^{N} K_k \right) \right\}$$ [Equation 9]

Thus, in the online processing, CPU 20 works as an estimating means. In the above description, the scale σ of a Gaussian kernel was not mentioned, but the optimum value of the scale σ differs depending upon an input vector for estimation and a parameter to be estimated. Therefore, it is desirable to determine the value while a parameter estimation experiment is performed.

Herein, the reason why parameters can be estimated by calculation using Equations 1 to 9 is described.

Hitherto, the present inventors have investigated a MAP (maximum a posteriori) estimation method as a method for estimating a parameter from an image signal. In the case where a joint distribution of input image I and parameter Q to be estimated is a distribution of random vectors according to a Gaussian distribution, the optimum estimated value of parameter Q can be calculated by using Equation 10.

$$Q = Q^a + \Sigma_{qi} \Sigma_i^{-1}(I - I^a)$$ [Equation 10]

In this equation, $\Sigma_{qi}$ denotes a cross covariance matrix, and $\Sigma_i^{-1}$ denotes an inverse matrix of a variance-covariance matrix.

Equation 10 is similar to an equation used for a so-called multiple regression analysis. However, it has been experimentally clarified that when the relation between input image I and parameter to be estimated Q becomes more complex and the joint distribution thereof cannot be expressed by a Gaussian distribution, the estimation cannot be carried with such a simple equation.

Then, the present inventors have focused on a new idea called "Kernel Trick," which has been introduced into an image recognition technique called Support Vector Machine and has produced excellent results. This method carries out non-linear transformation of an input vector and linear recognition in the transformed space. The present inventors have investigated introducing "Kernel Trick" into the MAP estimation method. As a result, they have established a new parameter estimation method called KMAP. Hereinafter, the detail thereof is described.

As shown in Equation 11, non-linear transformation of input vector $I_i$ is carried out by using nonlinear function φ. Herein, assuming that the joint distribution of transformed input vector φ ($I_i$) and parameter Q is a Gaussian distribution, parameter Q is expressed by Equation 12. Herein, φ ($I_i$) is abbreviated as $\phi_i$.

$$\phi: I \mapsto \phi(I)$$ [Equation 11]

$$Q = Q^a + \Sigma_{q\phi} \Sigma_\phi^{-1}(\phi(I) - \phi^a)$$ [Equation 12]

In the calculation of Equation 12, when non-linearly transformed statistics are used as they are for the calculation, vast amount of calculations in higher dimensional space are needed. However, if the operations as to transformed input vector $\phi_i$ can be brought together into the form of inner product $\phi_i \cdot \phi_j$, this inner product can be replaced by Kernel K ($\phi_i$, $\phi_j$). As a result, the calculation amount can be remarkably reduced.

Firstly, it is noted that inverse matrix $\Sigma_\phi^{-1}$ of the variance-covariance matrix can be expanded as in Equation 13. Herein, $\Phi=[\Phi_k]$ and $\Lambda=\text{diag}[\lambda_k]$ represent an eigenvector and an eigenvalue matrix of $\Sigma_\phi^{-1}$, respectively. Meanwhile, eigenvalue $\lambda_k$ is also an eigenvalue of deviation learning kernel matrix $K^c_{ij}=K^c(\phi_i, \phi_j)$ as shown in Equation 14.

$$\Sigma_{100}^{-1} \Phi \Lambda^{-1} \Phi^T$$ [Equation 13]

$$K^c \alpha^k = \lambda_k \alpha^k$$ [Equation 14]

Eigenvector $\Phi_k$ can be expanded as shown in Equation 15 by using the transformed input vector $\phi_i$. At this time, expansion coefficient $\alpha^k$ can be obtained as the k-th eigenvector of deviation learning kernel matrix $K^c_{ij}$. Therefore, when these values are substituted, inverse matrix $\Sigma_{100}^{-1}$ of the variance-covariance matrix can be rewritten as in Equation 16.

$$\Phi_k = \sum_{j=1}^{N} \alpha_j^k \phi_j^c$$ [Equation 15]

$$\sum_\phi^{-1} = \sum_{k=1}^{M} \lambda_k^{-1} \left( \sum_{j=1}^{N} \alpha_j^k \phi_j^c \right) \left( \sum_{j=1}^{N} \alpha_j^k \phi_j^c \right)^T$$ [Equation 16]

Next, cross covariance matrix $\Sigma_{Q\phi}$ can be calculated from Equation 17. When Equation 16 and Equation 17 are substituted into Equation 12, the order of calculation is changed, and the inner product $\phi_i \cdot \phi_j$ is replaced by learning kernel matrix $K_{ij}$, Equation 9 can be obtained.

$$\sum_{Q\phi} \frac{1}{N} \sum_{i=1}^{N} Q_i^c \phi_i^{cT}$$ [Equation 17]

Therefore, when average parameter vector $Q^a$, constant vector Ω, constant vector $\Gamma_k$ and eigenvector $\alpha^k$ have been calculated in advance by using N pieces of learning samples and when an input vector for estimation is input, parameter Q can be estimated by using Equations 6 to 9.

As the kernel, a polynomial kernel, a sigmoid kernel, a Gaussian kernel, and the like, may be used. What kernel is to use is dependent upon an input vector for estimation and a parameter to be estimated. Therefore, it is desirable to determine the kernel while a parameter estimation experiment is performed.

Second Exemplary Embodiment

In a second exemplary embodiment of the present invention, a face image collation device is described. The face image collation device estimates a coordinate of a feature in a face image by using parameter estimation device 100 of the first exemplary embodiment.

Figure 3:
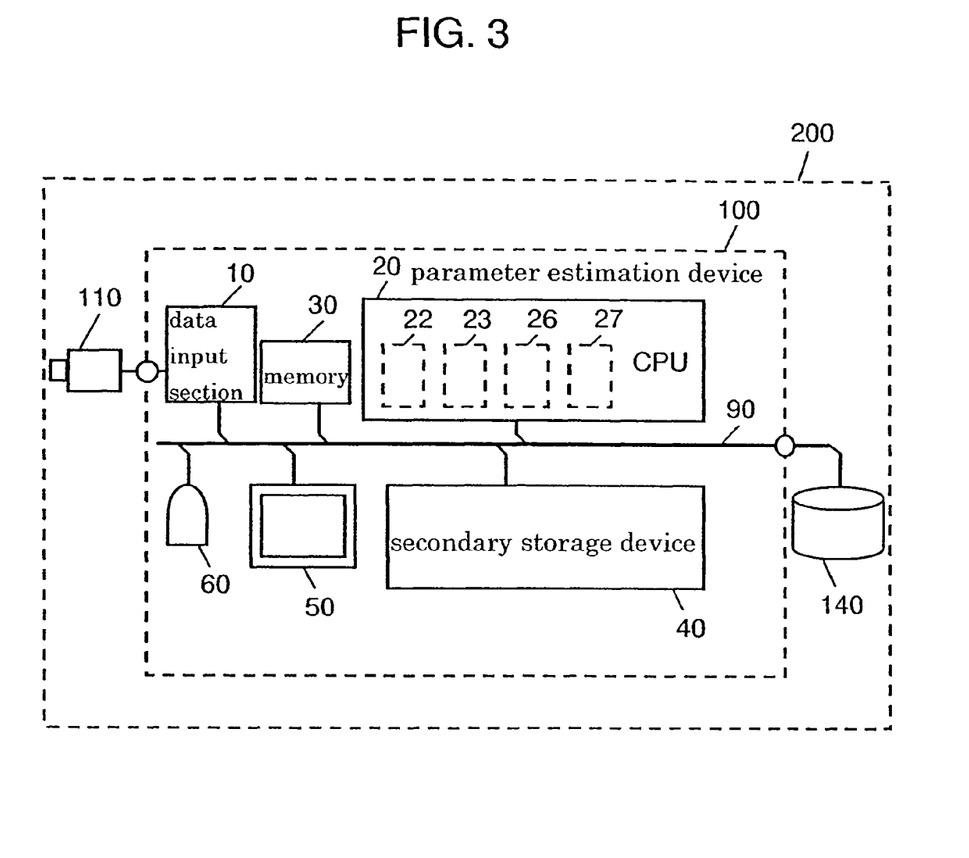
FIG. 3 is a block diagram showing a face image collation device in accordance with a second exemplary embodiment of the present invention.

FIG. 3 is a block diagram showing a face image collation device in accordance with the second exemplary embodiment of the present invention. Parameter estimation device 100 includes a computer system as in the first exemplary embodiment. The same reference number is given to each block as in the first exemplary embodiment and the description therefor is omitted herein. To face image collation device 200, video camera 110 for photographing person's face images is connected. In addition, face image database 140 is also connected to face image collation device 200. In face image database 140, person's face images that have been registered in advance are gathered.

Face image collation device 200 firstly finds coordinates of features of the eyes, nose, eyebrows, mouth, etc., from the input face image by using parameter estimation device 100 of the first exemplary embodiment. Next, based on the coordinates of the features, face image collation device 200 cuts out a face region to be used for face collation. Specifically, as the face region, for example, a square region having a coordinate of the nose in the center thereof, a side having a length that is two times longer than the interval between the eyes, and upper and lower sides being parallel with a line linking both eyes. Then, the cut-out face region is collated with face images registered in face image database 140. As a collation method, for example, a technique such as the eigenface method using a principal component analysis that is a statistical technique can be used.

An operation of parameter estimation device 100 for finding coordinates of features of the eyes, nose, eyebrows, mouth, etc., from an input face image is described in detail.

Firstly, an operation of offline processing for learning a correlation between an input image and a coordinate of a feature by using learning face images is described. The total number of the learning face images is N; an n-dimensional vector, in which the values of each pixel in the i-th learning face image are arranged in the raster scan order, is represented by input vector $I_i$; and a position coordinate of each feature is represented by m-dimensional parameter vector $Q_i$.

Figure 4:
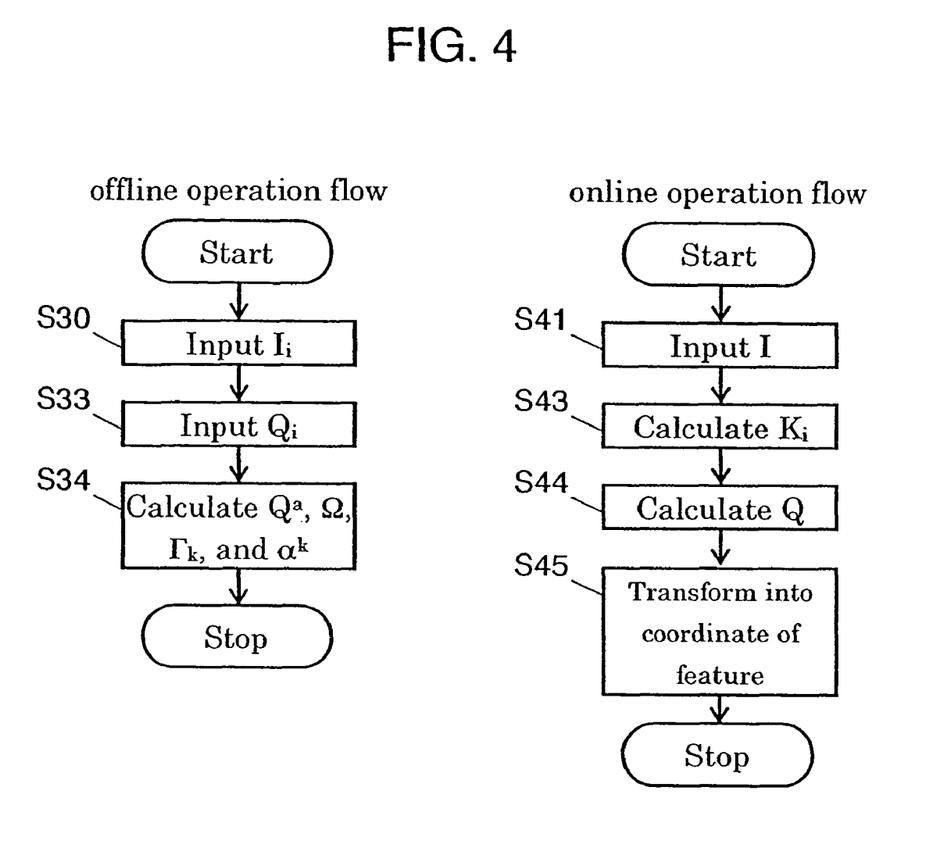
FIG. 4 is a flowchart of the face image collation device in accordance with the second exemplary embodiment of the present invention.
Figure 5:
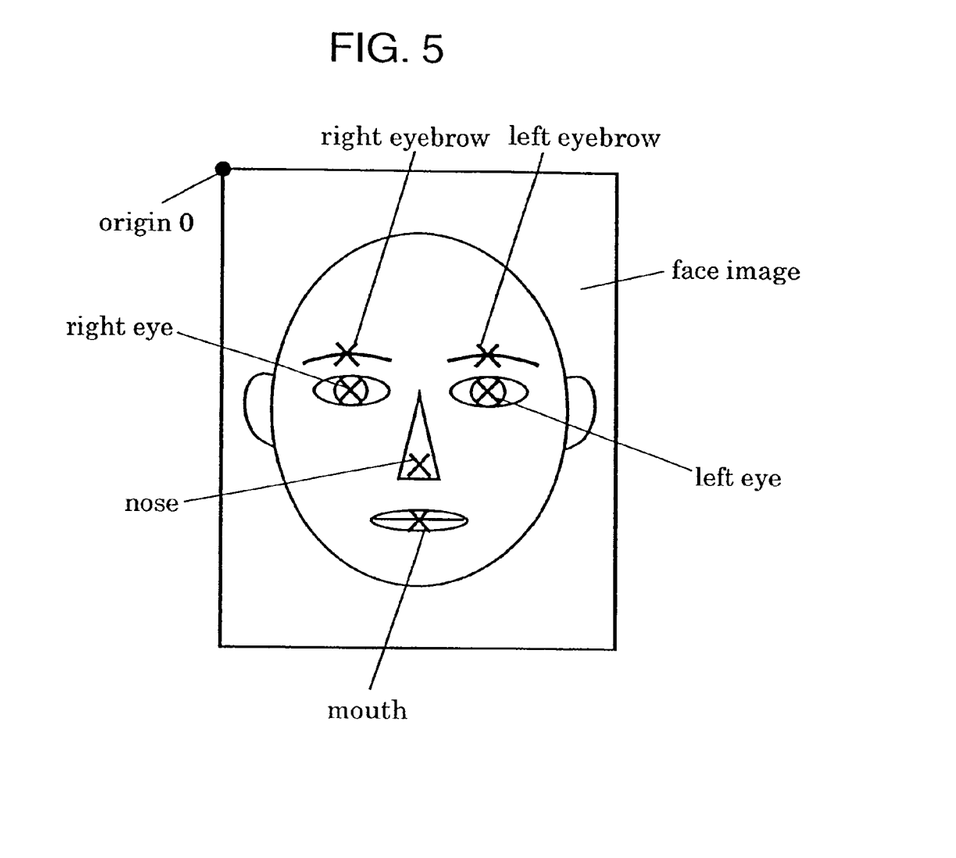
FIG. 5 shows an example of features of a face input by a user.

FIG. 4 is a flowchart of parameter estimation device 100 used in face image collation device 200 in accordance with the second exemplary embodiment of the present invention. Firstly, camera 110 photographs learning face images of N persons. Then, data input section 10 forms learning input vector $I_i$ (i=1 to N) by arranging values of each pixel in the respective face images in the raster scan order, and transfers the formed learning input vector $I_i$ to secondary storage device 40 so as to be stored therein (S30). Next, the learning face images (i.e., learning input vectors $I_i$) stored in secondary storage device 40 are displayed on display 50 one by one. Then, a user inputs features of a face manually by using mouse 60 while watching the learning face image. FIG. 5 shows an example of the features of the face input by a user. As the coordinate of the feature, a user inputs X-coordinate and Y-coordinate of each of right eyebrow, right eye, left eyebrow, left eye, nose and mouth based on the origin of the face image. CPU 20 arranges the values of the coordinate of the features input with respect to each of the learning face images and links them sequentially so as to obtain learning parameter vector $Q_i$ and stores the obtained vector $Q_i$ in secondary storage device 40 (S31).

Next, CPU 20 calculates average parameter vector $Q^a$, constant vector $\Omega$, constant vector $\Gamma_k$ and eigenvector $\alpha^k$ by using Equations 1 to 7, and stores them in secondary storage device 40 (S32). The processing mentioned above is executed offline in parameter estimation device 100.

Next, online processing is described.

Firstly, data input section 10 receives an input of a face image to be collated; arranges the values of each pixel in the face image in the raster scan order; transforms them into input vector I; and transfers it to secondary storage device 40 so as to be stored therein (S40). Next, CPU 20 calculates estimation kernel $K_i$ (i=1 to N) based on Equation 8 and transfers the calculated estimation kernel $K_i$ to secondary storage device 40 so as to be stored therein (S41). Then, CPU 20 reads out average parameter vector $Q^a$, constant vector $\Omega$, constant vector $\Gamma^k$ and eigenvector $\alpha^k$, which have been obtained in the offline processing, and estimation kernel $K^i$, which has been obtained in step S41, from secondary storage device 40; and calculates parameter vector Q showing a parameter to be estimated, by using Equation 9. Then, CPU 20 stores estimated parameter vector Q in secondary storage device 40 (S42). Next, CPU 20 breaks parameter vector Q down into coordinate data of the feature amount, and displays them on a display together with the input face image (S43). The operation mentioned above is an operation for finding coordinates of features of the eyes, nose, eyebrows, mouth, etc. from the input face images.

Thereafter, as mentioned above, based on the coordinates of the features, a face region used for face authentication is cut out, and the cut-out face region is collated with face images registered in face image database 140.

Then, an experiment of estimating features, in particular, estimating an eye position in a face image and a result of the experiment are described. The experiment is carried out by KMAP in face image collation device 200 in the second exemplary embodiment. By using 7200 face images of 2000 examinees, which were photographed with angles and distances changed, the estimation precision and stability of KMAP in the second exemplary embodiment of the present invention were evaluated. For comparison, estimations using (i) template matching (hereinafter, referred to as "MLG") based on the maximum likelihood using a Gaussian distribution; (ii) an eigenface method (hereinafter, referred to as "EF"), and (iii) a conventional MAP estimation method (hereinafter, referred to as "TMAP") using a Gaussian distribution were carried out simultaneously.

Figure 6:
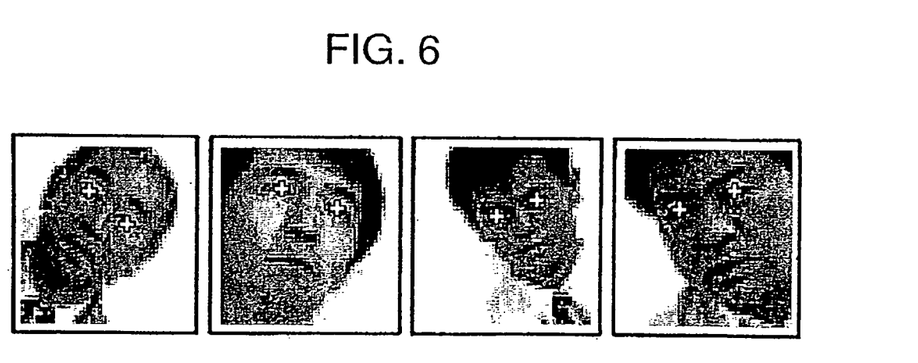
FIG. 6 shows some examples of extracted eye positions in the second exemplary embodiment of the present invention.

FIG. 6 shows some examples of the eye positions extracted in the second exemplary embodiment of the present invention. In FIG. 6, the extracted eye positions are shown by "x" on the input images.

Figure 7A:
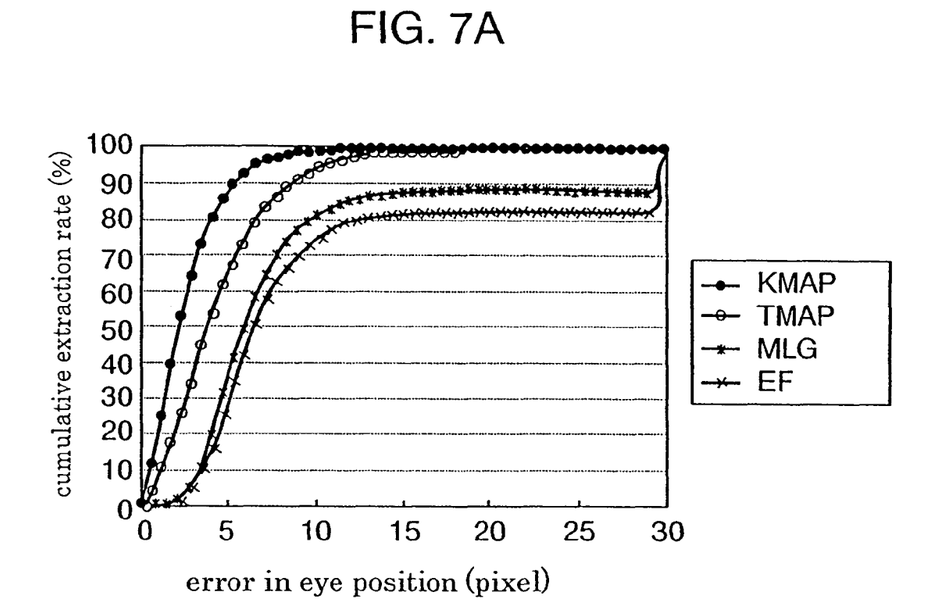
FIG. 7A is a graph showing the sensitivity of the face image collation device in the estimation of an eye position when an imaging distance is changed in the second exemplary embodiment of the present invention.
Figure 7B:
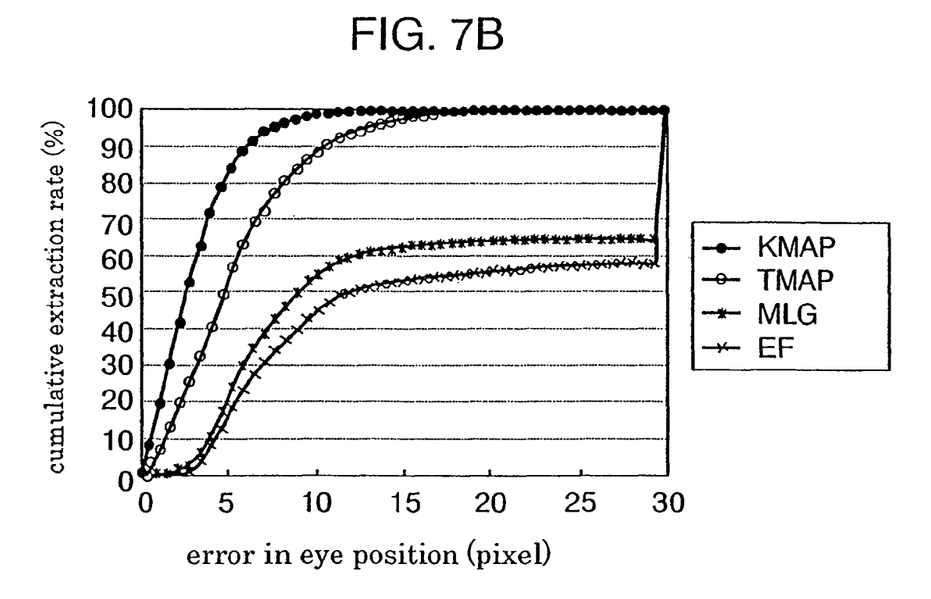
FIG. 7B is a graph showing the sensitivity of the face image collation device in the estimation of an eye position when an imaging angle is changed in the second exemplary embodiment of the present invention.

FIG. 7 is a graph showing the sensitivity of the face image collation device in the estimation of an eye position in the second exemplary embodiment of the present invention. FIG. 7A is a graph showing the sensitivity when a photographing distance is changed, and FIG. 7B is a graph showing the sensitivity when a photographing angle is changed. Abscissas shows error of the estimated eye position in pixel unit, and ordinate shows the cumulative extraction rate (correctness of the estimated coordinate of the eye position when the error shown in abscissas is allowed). Therefore, when the cumulative extraction rate is increased in the range having a few errors, the sensitivity in the estimation of the eye position is increased. Thus, it was proved that the estimation method by KMAP was more excellent than the other methods in any cases.

Figure 8A:
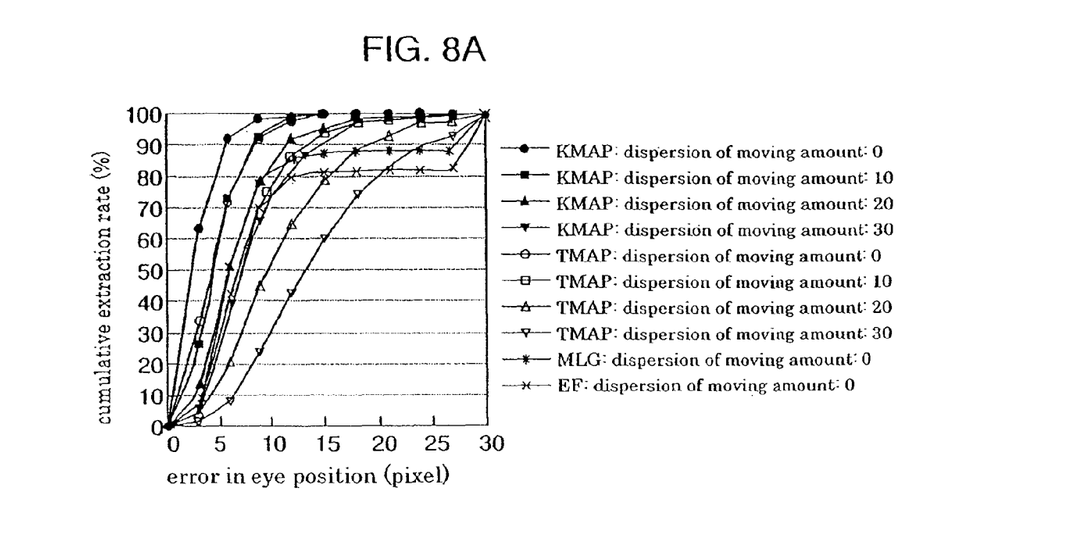
FIG. 8A is a graph showing the sensitivity in the estimation of an eye position according to the movement of a face position in a screen of a face image photographed from the front.
Figure 8B:
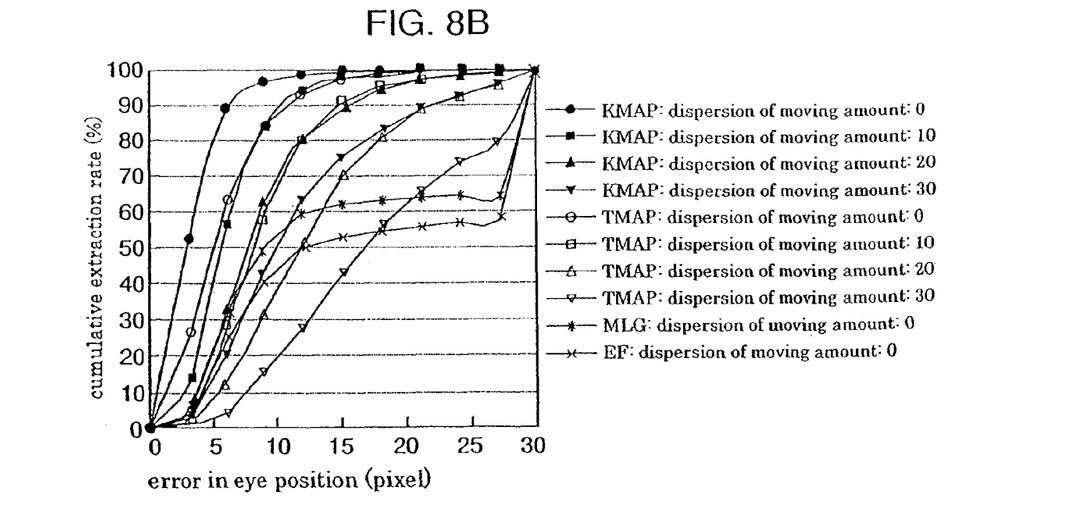
FIG. 8B is a graph showing the sensitivity in the estimation of an eye position according to the movement of a face position in a screen of a face image photographed from the oblique direction.

FIG. 8 is a graph showing the sensitivity in the estimation of an eye position corresponding to the movement of a face position in a screen. FIG. 8A is a graph showing the sensitivity when a face image is photographed from the front, and FIG. 8B is a graph showing the sensitivity when a face image is photographed from the oblique direction. Moving images were formed artificially by using rotational symmetric Gaussian distribution. The dispersion of the moving amount was made to be 0, 10, 20 and 30 pixels. The dispersion of the rotation angle was made to be 45°, the average reduction ratio was one time, and the dispersion was 0.5 times. FIGS. 8A and 8B show the sensitivity in the estimation of an eye position in each method with respect to each moving amount. Since performances of the MLG method and the EF method are not affected by the change of the moving amount, only results obtained when the dispersion of the moving amount was 0 are shown. Both FIG. 8A and FIG. 8B showed that the KMAP method was more excellent than the other methods until the dispersion of the moving amount was up to about 20 pixels and that the MLG method was slightly more excellent than the KMAP method when the dispersion of the moving amount was more than 30 pixels. From these results, it is apparently shown that as the dispersion of moving amount is increased, the performance of the KMAP method is decreased, and that the conventional MLG method is more excellent. However, as mentioned below, it was shown that, by using the KMAP method repeatedly, good performance was able to be obtained.

Figure 9:
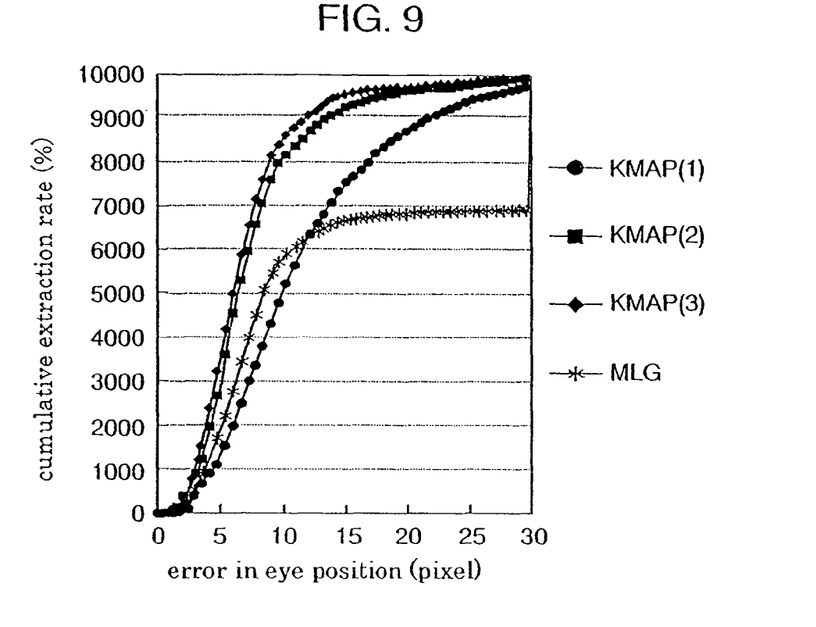
FIG. 9 is a graph showing the number of repetition and the sensitivity in the estimation of an eye position.

A method of repeating the KMAP method is described below. Firstly, an eye position is estimated by using the KMAP method. Next, by using the estimated eye position, an image region is normalized. Then, the eye position is estimated by the KMAP method again by using the normalized face image. The method of repeating the KMAP method n times in this way is represented by KMAP (n). FIG. 9 is a graph showing the sensitivity in the estimation of the eye position by KMAP (1)=KMAP, KMAP (2), KMAP (3) and MLG, with respect to a face image in which the dispersion of the moving amount is 30 pixels, respectively. Thus, it was proved that the performance of KMAP (n) was improved as the number n of repetition was increased.

The speed of estimating the eye position by the KMAP method was 0.8 seconds per image. The speed by the MLG method was six seconds per image (when a processor corresponding to Pentium IV (trademark) was used). Thus, in accordance with the KMAP method, not only the improvement of the estimation precision but also the shortening of the calculation time was able to be realized. Consequently, the features of the input data can be calculated precisely with a short processing time, and therefore at a low processing cost.

Third Exemplary Embodiment

In a third exemplary embodiment of present invention, a face image collation device for estimating height information of a face image by using parameter estimation device 100 of the first exemplary embodiment is described.

Figure 10:
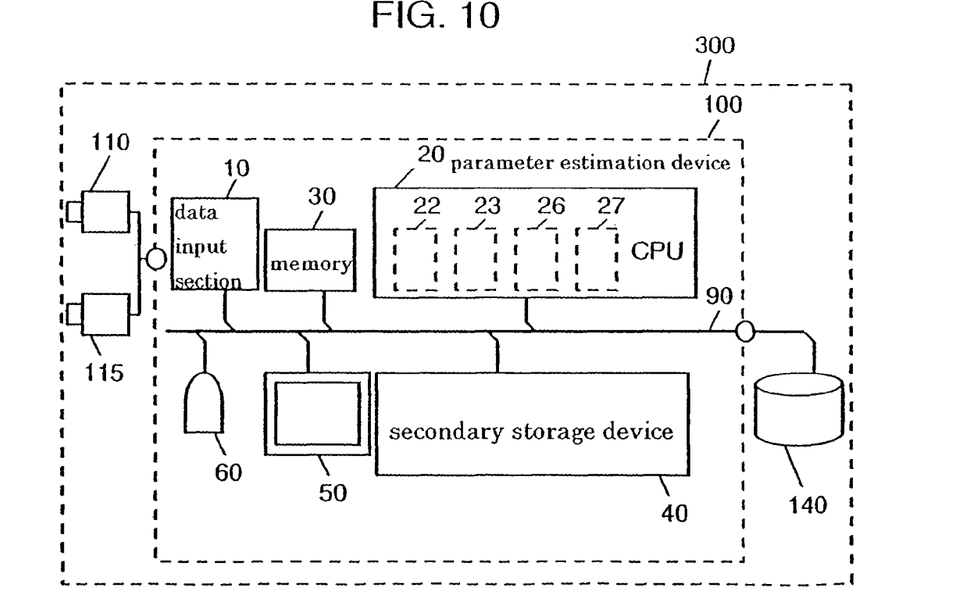
FIG. 10 is a block diagram showing a face image collation device in accordance with a third exemplary embodiment of the present invention.

FIG. 10 is a block diagram showing a face image collation device in accordance with the third exemplary embodiment of the present invention. Face image collation device 300 includes a computer system as in the second exemplary embodiment. The block diagram of face image collation device 300 is different from the block diagram of face image collation device 200 in that two cameras 110 and 115 are provided in order to photograph a face image from two directions.

Face image collation device 300 firstly estimates height information of a face image input by the use of parameter estimation device 100; then, synthesizes a two-dimensional face image seen from the same angle as that of a face image registered in face image database 140 based on the estimated three-dimensional face image information; and collates the synthesized face image with the registered face image. As a method of synthesizing the two-dimensional face image from the three-dimensional face image information, for example, a well-known method such as rendering in CG (computer graphics) can be used. For collation of the face images, for example, a technique such as the eigenface method using a principal component analysis that is a statistical technique can be used.

Hereinafter, an operation for estimating the height information of the input face image by using the above-mentioned face image collation device 300 is described. Firstly, an operation of offline processing for learning a correlation between an input image and the height information of the input image by using learning face images is described. As the method of learning height information, it may be possible to learn the height information with respect to each pixel of the input image, independently. However, the input image may be divided into a plurality of regions and the average height information of the regions may be learned. Since this method can reduce the dimension of a parameter vector to be estimated, it can be carried out more practically.

Also in this exemplary embodiment, similar to the second exemplary embodiment, the total number of the learning face images is N. An n-dimensional vector, in which the values of each pixel in the i-th learning face image are arranged in the raster scan order, is represented by input vector $I_i$; and a vector, in which the height information of each pixel or each region in the learning face image is arranged in the raster scan order, is represented by m-dimensional parameter input vector $Q_i$.

Figure 11:
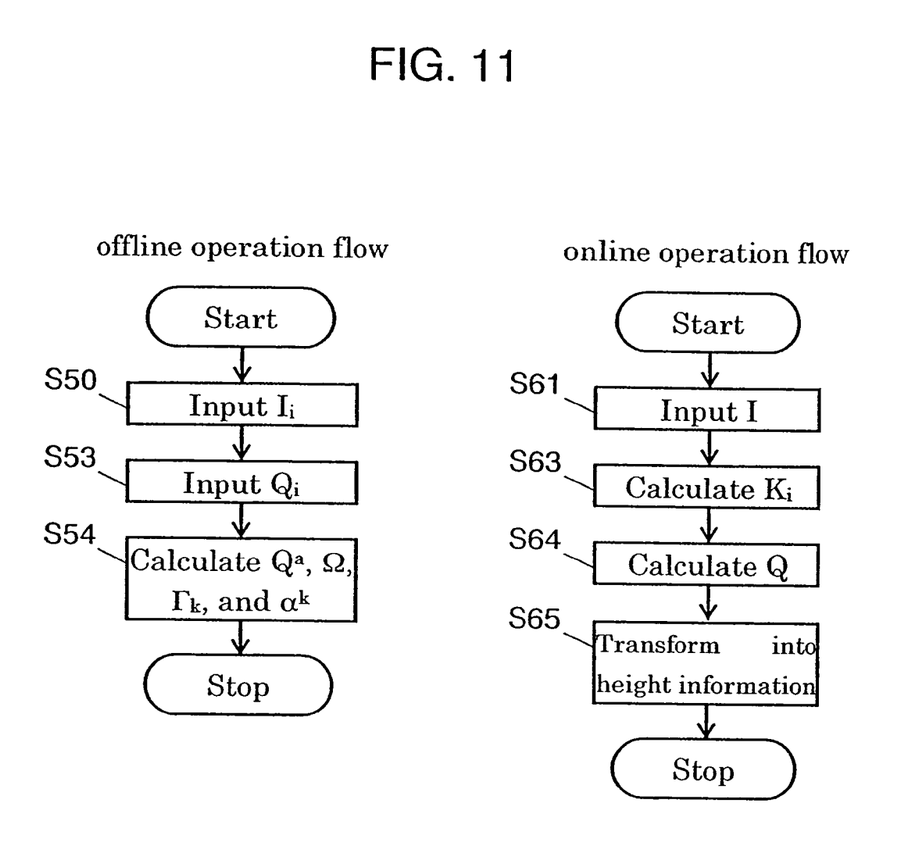
FIG. 11 is a flowchart of the face image collation device in accordance third and fourth exemplary embodiments of the present invention.

FIG. 11 is a flowchart of parameter estimation device 100 used in face image collation device 300 in accordance with the third exemplary embodiment of the present invention. Firstly, learning face images of N persons are photographed by two cameras 110 and 115 for photographing face images from the different directions. Data input section 10 transfers these face images to secondary storage device 40 so as to be stored therein. The learning face images photographed by one camera 110 are used as learning input vectors $I_i$, in which the values of each pixel are arranged in the raster scan order (S50). Next, CPU 20 generates three-dimensional information of the face image based on the two learning face images stored in secondary storage device 40. This is executed by using a well-known method such as rendering using CG. The height information of each pixel or each region are arranged sequentially and linked so as to form one vector. The thus formed vector is made to be learning parameter vector $Q_i$. Vector $Q_i$ is stored in secondary storage device 40 (S51).

Next, CPU 20 calculates average parameter vector $Q^a$, constant vector $\Omega$, constant vector $\Gamma_k$ and eigenvector $\alpha^k$ by using Equations 1 to 7, and stores them in secondary storage device 40 (S52). The processing mentioned above is executed offline in parameter estimation device 100.

Next, online processing is described. Firstly, data input section 10 receives an input of a face image to be collated; arranges the values of each pixel in the face image in the raster scan order; transforms them into input vector I; and transfers it to secondary storage device 40 so as to be stored therein (S60). Next, CPU 20 calculates estimation kernel $K_i$ (i=1 to N) based on Equation 8 and transfers the calculated estimation kernel $K_i$ to secondary storage device 40 so as to be stored therein (S61). Then, CPU 20 reads out average parameter vector $Q^a$, constant vector $\Omega$, constant vector $\Gamma_k$ and eigenvector $\alpha^k$, which have been obtained in the offline processing, and estimation kernel $K_i$, which has been obtained in step S61, from secondary storage device 40; and calculates parameter vector Q showing a parameter to be estimated, by using Equation 9. Then, CPU 20 stores estimated parameter vector Q in secondary storage device 40 (S62). Next, CPU 20 transforms the parameter vector into height information of the face image (S63). The operation mentioned above is that for estimating height information of the face image.

Thus, the estimated height information is added to the face image to be collated so as to generate three dimensional face information. Thereafter, as mentioned above, based on the three-dimensional face image information, a two-dimensional face image seen from the same angle as that of the face image registered in face image database 140 is synthesized. Based on coordinates of features with which the synthesized face image is collated with the registered face image, a face region used for face authentication is cut out. Then, the cut-out face region is collated with face image registered in face image database 140.

As mentioned above, in accordance with the third exemplary embodiment of the present invention, by using a two-dimensional face image facing an arbitrary direction, a face image facing the front or a face image facing the other directions can be synthesized. Therefore, even if a face image faces any directions, it can be collated with face images facing the front or facing the side registered in the face image database.

In the third exemplary embodiment, height information is estimated with respect to a face image to be collated and thereby, a two-dimensional face image seen from the same angle as that of a face image registered in the face image database is synthesized, and collation is carried out. However, a face image collation device other than the above can be configured by applying the parameter estimation device of the present invention. For example, with respect to a face image facing the front, which has been registered in the face image database in advance, the height information is estimated. Then, face images facing in some directions are newly registered as a database. Then, a face image to be collated may be collated with the newly registered face images. Thus, a face image collation device may be configured. Hereinafter, the configuration is described in detail as a fourth exemplary embodiment.

Fourth Exemplary Embodiment

A block diagram of a face image collation device in a fourth exemplary embodiment of the present invention includes a computer system as in the third exemplary embodiment. Since the block diagram is also the same as that of the third exemplary embodiment, the description therefor is omitted herein. Hereinafter, an operation of the face image collation device in accordance with the fourth exemplary embodiment of the present invention is described with reference to the flowchart shown in FIG. 11.

The operation of offline processing for learning a correlation between an input image and height information of the input image by using learning face images is also the same as that of the third exemplary embodiment.

Firstly, learning face images of N persons are photographed by two cameras 110 and 115 for photographing a face from the different directions. Data input section 10 transfers these face images to secondary storage device 40 so as to be stored therein. The learning face images photographed by one camera 110 are used as learning input vectors $I_i$, in which the values of each pixel are arranged in the raster scan order (S50). Next, CPU 20 generates three-dimensional information of the face image based on two learning face images stored in secondary storage device 40. The pieces of height information of each pixel or each region are arranged sequentially and linked so as to form one vector, and this vector is made to be learning parameter vector $Q_i$. Vector $Q_i$ is stored in secondary storage device 40 (S51). Then, CPU 20 calculates average parameter vector $Q^a$, constant vector $\Omega$, constant vector $\Gamma_k$, and eigenvector $\alpha_k$ by using Equations 1 to 7, and stores them in secondary storage device 40 (S52).

Next, with respect to each of the face images facing the front, which have been registered in face image database 140, face images facing in some directions are newly registered as a database. Specifically, data input section 10 arranges the values of each pixel in the face image facing the front, which have been registered in face image database 140, in the raster scan order; transforms them into input vector I; and transfers it to secondary storage device 40 (S60). Then, CPU 20 calculates estimation kernel $K_i$ (i=1 to N) based on Equation 8 and transfers the calculated estimation kernel $K_i$ to secondary storage device 40 so as to be stored therein (S61). Then, CPU 20 reads out average parameter vector $Q^a$, constant vector $\Omega$, constant vector $\Gamma_k$, and eigenvector $\alpha^k$, which have been obtained in the offline processing, and estimation kernel $K_i$, which has been obtained in step S61, from secondary storage device 40; calculates parameter vector Q showing a parameter to be estimated, by using Equation 9; and stores the calculated estimated parameter vector Q in secondary storage device 40 (S62). Next, CPU 20 transforms the parameter vector into height information of the face image, and adds the estimated height information to the registered face image so as to generate three-dimensional face information (S63). Thereafter, based on the three dimensional face image information, two-dimensional face images, seen from the angles such as right, oblique right, oblique left, left, oblique upper, oblique lower are synthesized. These synthesized images are newly registered in face image database 140. The above-mentioned processing is carried out with respect to each of the registered face images including only face images that are seen from one direction, and two-dimensional face images seen from the various directions are synthesized and registered as a database.

When the above-mentioned preparation has been executed offline in face image collation device 300, online processing can be extremely simplified as follows. Face image collation device 300 photographs a face image to be collated by using camera 110. Then, based on coordinates of features to be collated, a face region used for face authentication is cut out, and the cut-out face region is collated with face images registered in face image database 140.

As mentioned above, according to the fourth exemplary embodiment of the present invention, although the number of face images to be registered in the face image database is increased, the input face images can be directly collated with the face images registered in the face image database in the online processing. Therefore, collation can be carried out at high speed.

In the configurations of the first to fourth exemplary embodiments, the CPU reads a program, and thereby carries out the operations shown in the flowchart. However, any single-purposed processors capable of executing a learning means, a learning kernel matrix calculation means, an eigenvalue calculation means, an estimation means, an estimation kernel calculation means, a parameter calculation means, or the like, may be provided.

Furthermore, a computer program product that is a storage medium including instruction that can be used for programming a computer capable of executing the present invention is included within the scope of the present invention. Such storage media include a disk such as a flexible disk, an optical disk, CDROM, a magnetic disk, and the like, ROM, RAM, EPROM, EEPROM, magneto-optical card, memory card, DVD, and the like.

Furthermore, in the second to fourth exemplary embodiments, an example in which the parameter estimation device of the present invention is used for image collation is described. However, in the case where data other than image data are input as input data, the present invention can be used for a collation device for collation other than image collation. For example, when voice data are input as input data, the present invention can be used for a voice collation device.

The present invention can provide a parameter estimation method capable of precisely estimating a parameter with respect to input data with a short processing time or at a low processing cost, a parameter estimation device, and a collation method.

INDUSTRIAL APPLICABILITY

The present invention can provide a parameter estimation method capable of precisely estimating a parameter with respect to input data with a short processing time or at a low processing cost, a parameter estimation device, and a collation method. Therefore, the present invention is effective for a parameter estimation method capable of estimating a specific parameter from input data, a parameter estimation device and a collation method using the same, and the like.

The invention claimed is:

1. A collation method using a parameter estimation device, comprising:
   learning means for learning a correlation between a plurality of learning input data in which a parameter to be estimated is known and a parameter corresponding to each of the learning input data; and
   estimation means for estimating a parameter with respect to estimating input data in which a parameter to be estimated is unknown by using the learned correlation;
   wherein the learning means including a learning kernel matrix calculation means for calculating a learning kernel matrix by using the plurality of learning input data in which a parameter to be estimated is known, and an eigenvalue calculation means for obtaining an eigenvalue and an eigenvector of an inverse matrix of the learning kernel matrix; and
   the estimation means including an estimation kernel calculation means for calculating an estimation kernel by using the estimating input data in which a parameter to be estimated is unknown and the learning input data, and a parameter calculation means for calculating a parameter with respect to the estimating input data by using the learning kernel matrix, and the eigenvalue and the eigenvector of the inverse matrix of the learning kernel matrix;
   wherein the estimating input data and the learning input data are an image including a face, and the parameter to be estimated is a coordinate of a feature of the face;
   the method comprising:
   estimating a coordinate of a feature of a face with respect to a face image to be collated by using the parameter estimation device;
   then cutting out a face region based on the coordinate of the feature of the face; and
   collating a face image registered in the face image database with the cut-out face region.

2. A collation method using a parameter estimation device, comprising:
   learning means for learning a correlation between a plurality of learning input data in which a parameter to be estimated is known and a parameter corresponding to each of the learning input data; and
   estimation means for estimating a parameter with respect to estimating input data in which a parameter to be estimated is unknown by using the learned correlation;
   wherein the learning means including a learning kernel matrix calculation means for calculating a learning kernel matrix by using the plurality of learning input data in which a parameter to be estimated is known, and an eigenvalue calculation means for obtaining an eigenvalue and an eigenvector of an inverse matrix of the learning kernel matrix; and
   the estimation means including an estimation kernel calculation means for calculating an estimation kernel by using the estimating input data in which a parameter to be estimated is unknown and the learning input data, and a parameter calculation means for calculating a parameter with respect to the estimating input data by using the learning kernel matrix, and the eigenvalue and the eigenvector of the inverse matrix of the learning kernel matrix;
   wherein the estimating input data and the learning input data are an image including a face, and the parameter to be estimated is a coordinate of a feature of the face,
   the method comprising:
   repeating a face image normalization operation plural times, the operation including estimating a coordinate of a feature of a face by using the parameter estimation device and normalizing an image region based on the coordinate of the feature of the face;
   then cutting out a face region based on the coordinate of the feature of the face; and
   collating a face image registered in the face image database with the cut-out face region.

3. A collation method using a parameter estimation device, comprising:
   learning means for learning a correlation between a plurality of learning input data in which a parameter to be estimated is known and a parameter corresponding to each of the learning input data; and
   estimation means for estimating a parameter with respect to estimating input data in which a parameter to be estimated is unknown by using the learned correlation;
   wherein the learning means including a learning kernel matrix calculation means for calculating a learning kernel matrix by using the plurality of learning input data in which a parameter to be estimated is known, and an eigenvalue calculation means for obtaining an eigenvalue and an eigenvector of an inverse matrix of the learning kernel matrix; and
   the estimation means including an estimation kernel calculation means for calculating an estimation kernel by using the estimating input data in which a parameter to be estimated is unknown and the learning input data, and a parameter calculation means for calculating a parameter with respect to the estimating input data by using the learning kernel matrix, and the eigenvalue and the eigenvector of the inverse matrix of the learning kernel matrix;
   wherein the estimating input data and the learning input data are an image including a face, and the parameter to be estimated is height information of the face image;
   and a face image database,
   the method comprising:
   estimating height information with respect to a face image to be collated by using the parameter estimation device; and
   then synthesizing a two-dimensional image seen from a same angle as an angle of a face image registered in the face image database based on the height information of the face image and carrying out a collation.

4. A collation method using a parameter estimation device, comprising:
   learning means for learning a correlation between a plurality of learning input data in which a parameter to be estimated is known and a parameter corresponding to each of the learning input data; and estimation means for estimating a parameter with respect to estimating input data in which a parameter to be estimated is unknown by using the learned correlation;

wherein the learning means including a learning kernel matrix calculation means for calculating a learning kernel matrix by using the plurality of learning input data in which a parameter to be estimated is known, and an eigenvalue calculation means for obtaining an eigenvalue and an eigenvector of an inverse matrix of the learning kernel matrix; and the estimation means including an estimation kernel calculation means for calculating an estimation kernel by using the estimating input data in which a parameter to be estimated is unknown and the learning input data, and a parameter calculation means for calculating a parameter with respect to the estimating input data by using the learning kernel matrix, and the eigenvalue and the eigenvector of the inverse matrix of the learning kernel matrix;

wherein the estimating input data and the learning input data are an image including a face, and the parameter to be estimated is height information of the face image;

and a face image database, the method comprising:

estimating height information with respect to a face image registered in the face image database by using the parameter estimation device;

then synthesizing a two-dimensional image seen from an angle that is different from an angle of the registered face image; and additionally registering the synthesized two-dimensional image in the face image database.

* * * * *